UNITED STATES PATENT OFFICE 2,431,644

PREPARATION OF GUANIDES

Donald W. Kaiser, Riverside, Conn., assignor to American Cyanamid Company, New York, N. Y., a corporation of Maine No Drawing. Application January 15, 1943, Serial No. 472,483

3 Claims. (Cl. 260—249.5)

This invention relates to a new method of preparing aliphatic, alicyclic and aromatic granides.

In the copending application of Donald W. Kaiser and Jack T. Thurston Serial No. 445,206, filed May 30, 1942, there is disclosed the preparation of aliphatic, cycloaliphatic and aromatic acyl dicyandiamides and salts thereof as new compounds. These acylated dicyandiamides are prepared by mixing acyl halides or acyl anhydrides with dicyandiamide in the presence of water and water soluble alkali metal or alkaline earth metal oxides and hydroxides at temperatures not in excess of about 60° C.

The present invention is based upon my discovery that the acyl dicyandiamides and their ammonium and primary amine salts described in the aforesaid copending application can be converted into aliphatic, alicyclic and aromatic guanides with good yields and a high degree of purity by merely heating the desired acyl dicyandiamide dissolved in a suitable solvent. I have also discovered that the conversion of the acyl dicyandiamides and their ammonium and primary amine salts to the corresponding guanides may be catalyzed with certain catalytic agents of the class to be more fully described hereinafter.

The aliphatic, alicyclic and aromatic acyl dicyandiamides which may be employed to prepare substituted guanides by my new process are those described in the afore-named application and have the general formula

in which R is an aliphatic, cycloaliphatic or aromatic radical and D is a dicyandiamide radical. Although these acyl dicyandiamides may theoretically have several possible isomeric forms each in turn having several possible tautomeric forms, it is believed that they may in general be represented by the formula

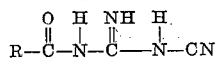

in which R is an aliphatic, alicyclic or aromatic radical.

The aliphatic, alicyclic and aromatic guanides which may be prepared by the process of the present invention may be represented by the general formula

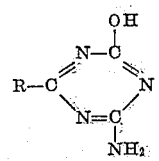

or an isomeric form thereof, in which R is as indicated above. Although the triazine ring structure given above for the guanides is thought to be correct the chemical behaviour of these compounds indicates that they may also exist in several tautomeric forms under different conditions. Accordingly, while guanides possessing the triazine ring structure above may be called 2-R-4-hydroxy-6-amino-1,3,5-triazines, this latter nomenclature designates only one of the tautomeric forms. For this reason the compounds as a class are more accurately known as aliphatic, alicyclic and aromatic guanides.

The process of the present invention for the preparation of guanides consists essentially of the steps of dissolving a desired aliphatic, alicyclic or aromatic acyl dicyandiamide, or an ammonium or primary amine salt thereof in a suitable solvent and allowing the reaction mixture to stand, preferably with heating, until the corresponding aliphatic, alicyclic or aromatic guanide is formed.

Under the preferred conditions of the reaction the guanides are usually insoluble and precipitate out of solution as they are formed. Cooling the reaction mixture after the conversion decreases their solubility and makes it possible to separate the product from the mother liquor in higher yields. The precipitated guanide may then be recovered by decantation, filtration, centrifuging, etc., and washed and dried as disclosed in the specific examples. The product may, if desired, be further purified by recrystallization from suitable solvents.

Although solutions containing acyl dicyandiamides or ammonium and primary amine salts thereof will form guanides upon standing, and particularly upon heating at temperatures of about 60° C. or over, this process of converting the acyl dicyandiamide to the corresponding guanide is relatively slow, usually requiring about one hour or more at refluxing temperatures. I have discovered, however, that the conversion can be catalyzed with ammonia, ammonium salts, primary amines having a dissociation constant of at least $1 \times 10^{-10}$ and salts thereof. As indicated by the specific examples the catalysts for the guanide conversion include a wide variety of primary amines and their salts such as, specifically, aniline, n-butyl amine, p-phenetidine, o-toluidine, p-toluidine, β-naphthyl amine, p-phenylene diamine, o-phenylene diamine, 1-amino-2,4-dimethyl benzene, monoethyl amine, isopropyl amine, ethylene diamine, trimethylene diamine, tetramethylene diamine, allyl amine, benzyl amine, ethylene diamine, isoamyl amine, triethylene tetramine, 2-ethylhexyl amine, n-octyl amine, and the like.

The salts of these primary amines which may be used as catalysts may be of either organic or inorganic acids. It appears to make little difference whether the salt is one of a strong acid or a weak acid since I have used ammonium and primary amine salts or such acids as sulfuric, nitric, hydrochloric, acetic, salicylic, etc. with good catalytic effects. When using a catalyst for the conversion the reaction time is very materially reduced and may require only about 4 or 5 minutes at refluxing temperatures. A slightly longer period of heating is usually employed since it is desirable that the conversion be as complete as possible. The catalysts are employed in catalytic amounts generally not more than about 10 or 15% of the molecular amount of the dicyandiamide. Since the chemical mechanism by which the acyl dicyandiamides are converted into the corresponding guanides can not be stated with certainty at the present time it is quite obvious that the role played by the catalyst in the conversion is also obscure and not satisfactorily explained.

In carrying out the reaction a suitable acyl dicyandiamide is dissolved in a solvent such as water-, Cellosolve (mono ethyl ether of ethylene glycol), water and Cellosolve, alcohol, dioxane, pyridine or the like. An excess of solvent is avoided in order that the guanide which is formed may precipitate and be easily recovered from its mother liquor. In the case of some solvents, such as water, in which some acyl dicyandiamides are difficultly soluble it will be necessary to heat the reaction mixture to dissolve the acyl dicyandiamide. Since the best yields of the guanide are obtained in a minimum of time at elevated temperature it is usually desirable to heat the solution under a refluxing condenser at refluxing temperatures until the conversion is substantially complete. As stated before, when a catalyst is used the guanide commences to separate from the solution after heating it for only a few minutes. Ordinarily when using a catalyst the conversion is substantially complete within 30 minutes. When no catalyst is employed the guanide will usually commence to separate out of the solution after about one hour's heating at refluxing temperatures but may require 10 or 15 hours for satisfactory conversion. At lower temperatures, of course, still longer periods of time will be required in the absence of a catalyst.

Among the various aliphatic, alicyclic and aromatic acyl dicyandiamides which may be successfully converted to the corresponding aliphatic, alicyclic or aromatic guanides may be specifically mentioned: butyryldicyandiamide, caproyldicyandiamide, lauryldicyandiamide, stearyldicyandiamide, palmityldicyandiamide, α-bromcaproyldicyandiamide, 9,10-dichlorstearyldicyandiamide, γ-nitrovaleryldicyandiamide, β-N-acetylbutylaminopropionyldicyandiamide, ω-hydroxydecanoyldicyandiamide, ω-carboxyvaleryldicyandiamide, adipyldicyandiamide, sebacyldicyandiamide, succinyldicyandiamide, phthaloyldicyandiamide, hexahydrophthaloyldicyandiamide, benzoyldicyandiamide, p-aminobenzoyldicyandiamide, p-nitrobenzoyldicyandiamide, o-nitrobenzoyldicyandiamide, o-carboxybenzoyldicyandiamide, p-hydroxybenzoyldicyandiamide, m-hydroxyphenoxyacetyldicyandiamide, α-naphthoyldicyandiamide, β-5-sulfonaphthoyldicyandiamide, naphthenoyldicyandiamide, cyclohexylacetyldicyandiamide, hexahydrobenzoyldicyandiamide, cyclopentylacetyldicyandiamide, ω-carboxylpelargonyldicyandiamide, and the ammonium and primary amine salts of these acyl dicyandiamides and others falling within the scope of the previously mentioned copending application of Kaiser and Thurston.

Many of the aliphatic, alicyclic and aromatic guanides prepared in accordance with the herein described process are new compounds. In general, in their purified state, they are white crystalline powders exhibiting both plate-like and needle-like crystals. Those containing nitro groups may be slightly yellowish in color. They are characterized further by having a high decomposition point, most of them decomposing without melting. They are easily soluble in alkalis of moderate strength, are fairly soluble in acids and are slightly soluble in water. They are soluble in organic solvents such as Cellosolve (the ethyl ether of ethylene glycol), alcohol, dioxane, pyridine, etc., and those having moderately long alkyl chains are very slightly soluble in benzene. They are practically insoluble in ether and mineral spirits. These compounds are of value as intermediates in the preparation of dystuffs and resins.

My invention will now be illustrated in greater detail by means of the following specific examples in which the preparation of typical substituted guanides is described. All parts are by weight unless otherwise noted. It should be understood that my new process is not to be limited to these particular examples or the particular conditions employed therein, since as stated above, the process is susceptible to many changes, and the invention is to be construed as broadly as the appended claims permit.

*Example 1*

Into a large stainless steel container, equipped with a double bladed stirrer (on a "Lightnin" mixer), a thermometer, and a dropping funnel, was placed 1155 g. (13.75 mols) of dicyandiamide, 10 liters of acetone, and 7.0 cc. of water. The stirred slurry was cooled to 10° C. and 726 g. (11.0 mols) of 85% potassium hydroxide pellets was added. After stirring at 0 to 10° C. for half an hour, another 726 g. of 85% potassium hydroxide pellets was added and stirring continued another half hour. The agitated mixture was then kept at −8 to −2° C. for 3.25 hours while 1546 g. (11.0 mols) of benzoyl chloride was slowly added. The homogeneous, creamy mass was then stirred an additional hour at 0 to 3° C. before it was diluted with 5 times its volume of water. The cold, colorless solution was stirred while it was gradually acidified with acetic acid. The resulting colorless precipitate was filtered, thoroughly washed with water, and air dried. The yield of benzoyldicyandiamide, decomposing on heating at 187 to 188° C., was 87% of the theoretical.

A suspension of 18.8 g. of benzoyldicyandiamide in 300 cc. of water was refluxed for 4 hours. After cooling, the solid was filtered, washed with a little acetone and allowed to dry. The yield of benzoguanide, decomposing on heating at 322 to 323° C. was 13.7 g. or 72.5% of theoretical.

*Example 2*

After refluxing a solution containing 9.4 g. (0.05 mol) of benzoyldicyandiamide in a mixture of 125 cc. of water and 75 cc. of Cellosolve for one hour, solid began to appear. Heating was discontinued and the colorless solid filtered. After drying in an oven at 110° C. a 60.5% yield of benzoguanide, decomposing at 323° C. was obtained.

*Example 3*

After adding 125 cc. of water and 75 cc. of Cellosolve to a flask containing 9.4 g. (0.05 mol) of benzoyldicandiamide and 1.0 g. of aniline sulfate, the whole was heated to reflux. Within 5 minutes a large quantity of colorless solid separated from the hot solution. Heating was continued 5 minutes longer, the mixture cooled, ice added, the solid filtered, washed with water, and dried in an oven at 110° C. The benzoguanide decomposed at 321° C. and weighed 7.0 g. which represented a 74.5% yield.

Example 4

Into a small flask was placed 9.4 g. (0.05 mol) of benzoyldicyandiamide, 1.0 g. of aniline hydrochloride, 125 cc. of water, and 75 cc. of Cellosolve. Complete solution occurred after heating the mixture to reflux but within 5 minutes crystals of benzoguanide began to appear. Heating was continued 5 minutes longer before the flask which now contained a large quantity of solid was allowed to cool. Ice was added, the solid filtered, washed with water, and dried in an oven at 110° C. The yield of benzoguanide which decomposed at 323° C. was 6.0 g. or 64% of theory.

Example 5

A clear solution resulted after heating to reflux a mixture of 9.4 g. (0.05 mol) of benzoyldicyandiamide, 1.0 g. of ammonium nitrate, 75 cc. of Cellosolve, and 125 cc. of water. After 10 minutes solid began to separate from the hot solution. Heating was continued 5 minutes longer, the mixture cooled, ice added and the bulky solid filtered. The product was washed thoroughly with water and dried in an oven at 110° C. The colorless benzoguanide decomposed at 323° C. and weighed 6.2 g. or represented a 66% yield.

Example 6

A clear solution resulted after heating a mixture of 9.4 g. (0.05 mol) of benzoyldicyandiamide, 1.0 g. of n-butylamine sulfate, 75 cc. of Cellosolve, and 125 cc. of water to reflux. After 8 minutes, a large quantity of colorless solid separated from the hot solution. Refluxing was continued 10 minutes longer, the mixture cooled, diluted with ice, the solid filtered, washed with water, and dried in an oven at 110° C. The colorless, fluffy benzoguanide crystals decomposed at 324° C. and weighed 6.4 g. which represented a 68% yield.

Example 7

A mixture consisting of 9.4 g. (0.05 mol) of benzoyldicyandiamide, 1.0 g. of p-phenetidine hydrochloride, 75 cc. of Cellosolve, and 125 cc. of water was heated to reflux. After 5 minutes a large quantity of colorless solid crystallized from solution. Heating was continued 5 minutes longer, the mixture allowed to cool, and ice added. The product was filtered, washed with water, and dried in an oven at 110° C. A 71.2% yield (6.7 g.) of benzoguanide, decomposing at 323° C., was obtained.

Example 8

After 16 minutes of reflux, solid separated from a solution which contained 9.4 g. (0.05 mol) of benzoyldicyandiamide and 1.0 g. of o-toluidine sulfate in a mixture of 125 cc. of water and 75 cc. of Cellosolve. Heating was continued 15 minutes longer before ice was added to the mixture, the solid filtered, washed with water, and dried in an oven at 110° C. The nearly colorless benzoguanide weighed 4.5 g. and decomposed at 321° C. The yield was 47% of the theoretical.

Example 9

Into a small flask was placed 9.4 g. (0.05 mol) of benzoyldicyandiamide, 1.0 g. of β-naphthylamine sulfate, 75 cc. of Cellosolve, and 125 cc. of water. After 13 minutes of refluxing, solid began to separate from the clear solution. Heating was continued 5 minutes longer. After cooling, ice was added, the solid filtered, washed with water, and dried at 110° C. in an oven. The weight of nearly colorless benzoguanide was 5.3 g. or a 56.5% yield. Decomposition occurred on heating to 322° C.

Example 10

A clear solution resulted after refluxing a mixture of 9.4 g. (0.05 mol) of benzoyldicyandiamide, 0.50 g. of mono-n-butylamine, 75 cc. of Cellosolve, and 125 cc. of water. Within 4 minutes the flask was nearly filled with cotton-like needles of benzoguanide. After cooling, a few drops of glacial acetic acid and ice were added, the solid filtered and washed with water. The solid was dried in an oven at 110° C. After drying 7.0 g. of benzoguanide, decomposing at 325° C. was obtained. The yield was 74% of theory.

Example 11

2 cc. of concentrated ammonium hydroxide was added to a flask which contained 9.4 g. (0.05 mol) of benzoyldicyandiamide, 75 cc. of Cellosolve, and 125 cc. of water. After heating to reflux a clear solution resulted, but after 17 minutes solid began to separate from solution. Refluxing was continued for 5 minutes longer, the mixture acidified with acetic acid and cooled. Ice was added, the colorless crystals, benzoguanide, were filtered, washed with water and dried in an oven at 110° C. The weight of benzoguanide represented a 60% conversion of the benzoyldicyandiamide. Decomposition of the product occurred when it was heated to 324° C.

Example 12

Into a small flask was placed 9.4 g. (0.05 mol) of benzoyldicyandiamide, 0.37 g. of mono-n-butylamine, 0.69 g. of salicylic acid, 125 cc. of water, and 75 cc. of Cellosolve. Within 3.5 minutes after reflux commenced, snow-white solid crystallized from solution. Refluxing was continued 5 minutes longer before cooling the flask. Ice was then added, the fluffy solid filtered, thoroughly washed with water, and dried in an oven at 110° C. Decomposition of the benzoguanide occurred on heating at 324° C. The yield was 84% of the theoretical.

Example 13

A mixture of 9.4 g. (0.05 mol) of benzoyldicyandiamide, 0.73 g. of mono-n-butylamine, 0.60 g. of glacial acetic acid, 75 cc. of Cellosolve, and 125 cc. of water were heated to reflux, giving a clear solution. After 3.5 minutes of heating a large quantity of fluffy, colorless needles crystallized from the hot solution. Heating was continued 5 minutes longer, the mixture cooled, ice added, the solid filtered, washed with water, and dried in an oven at 110° C. The weight of benzoguanide obtained was 7.9 g. or 84% of the theoretical yield. The product decomposed on heating at 325° C.

Example 14

A clear solution containing 12.6 g. (0.10 mol) of acetyldicyandiamide in 250 cc. of 50% Cellosolve was prepared by heating the mixture to reflux. Two grams of aniline hydrochloride were added and refluxing continued. Within 2 minutes colorless solid began to separate from solution. Heating was continued 15 minutes longer, the mixture cooled, ice added, the solid filtered, washed with water and dried in an oven at 110°

C. The colorless, minute crystals weighed 7.2 g. which represented a 57.5% yield of acetoguanide. The product was infusible, soluble in alkali and reprecipitated by addition of acid.

*Example 15*

A mixture of 12.2 g. of caproyldicyandiamide and 30 cc. of Cellosolve (the ethyl ether of ethylene glycol) was heated to reflux. A clear solution resulted and refluxing was continued for 4 hours. Additional Cellosolve was then added to dissolve the small quantity of insolubles which had formed. After filtration to remove dirt, the solution was drowned in water. The colorless precipitate was slightly sticky and smelled of caproic acid. The solid was filtered, washed with water, and then acetone to remove caproic acid, and allowed to dry. The product decomposed at 240 to 241° C. and gave no depression of the decomposition point when fused with a known sample of caproguanide. The yield was 7.8 g. or 64.5% of the theoretical.

*Example 16*

A solution of 10 g. of lauroyldicyandiamide in 50 cc. of Cellosolve was refluxed for 7 hours and then diluted with water. The semi-solid precipitate (smelling of lauric acid) was dissolved in sodium hydroxide solution, filtered to remove dirt, and the filtrate acidified with acetic acid. The amorphous solid was filtered and then digested with methanol to remove any lauric acid. The mixture was filtered hot and the solid allowed to dry. Lauroguanide, decomposing at 227 to 229° C. was obtained. Crystallization from Cellosolve gave colorless plates which decomposed at 229 to 230° C. No depression in the decomposition point was obtained when a mixed melting point was taken with a known sample of lauroguanide which also decomposed at 229 to 230° C.

*Example 17*

A suspension of 5.0 g. of n-butyryldicyandiamide in 10 cc. of Cellosolve was heated to reflux. Complete solution occurred and refluxing was continued until about 15 minutes later so much solid had separated that the mixture commenced to bump. Water was added, the solid filtered, washed with acetone and air-dried. The filtrate contained some butyric acid as judged by the odor. The yield of crude butyroguanide crystals was 2.7 g. or 54% of the theoretical. Decomposition occurred at 263 to 267° C. with some softening below this temperature. A fusion of the product with a known sample of butyroguanide began to decompose at 263° C.

*Example 18*

A mixture consisting of 15.2 g. (0.05 mol) of naphthenyldicyandiamide (derived from monobasic naphthenic acids whose average neutral equivalent was 238) 150 cc. of 50% Cellosolve, and 0.50 g. of aniline hydrochloride was heated to reflux. Complete solution occurred but within 7 minutes amorphous solid began to separate from the hot solution. After heating 10 minutes longer, the mixture was cooled, ice added, the solid filtered, washed with water and dried in an oven at 105° C. The yield of colorless solid was 10.3 g. or 68% of theory.

I claim:

1. A process of preparing aromatic guanides which comprises dissolving a member of the group consisting of aromatic acyl dicyandiamides and ammonium and primary amine salts thereof in a solvent and heating the solution at temperatures of at least about 60° C. until an aromatic guanide is formed and thereafter recovering the guanide.

2. A process of preparing aromatic guanides which comprises dissolving an aromatic acyl dicyandiamide and a member of the group consisting of ammonia, ammonium salts and primary amines having a dissociation constant of at least $1 \times 10^{-10}$ and salts thereof in a solvent and heating the mixture at temperatures of at least about 60° C. until an aromatic guanide is formed and thereafter recovering the guanide.

3. A process of preparing benzoguanide which comprises dissolving benzoyldicyandiamide in an aqueous solvent, heating the reaction mixture at temperatures of at least about 60° C. until substantial quantities of benzoguanide have been formed, cooling the reaction mixture and separating the benzoguanide from its mother liquor.

DONALD W. KAISER.

REFERENCES CITED

The following references are of record in the file of this patent:

UNITED STATES PATENTS

| Number | Name | Date |
|---|---|---|
| 2,273,687 | Bock | Feb. 17, 1942 |
| 1,417,369 | Davis | May 23, 1922 |

FOREIGN PATENTS

| Number | Country | Date |
|---|---|---|
| 546,027 | Great Britain | June 24, 1942 |

OTHER REFERENCES

Fuson and Shriner, p. 147, Identification of Organic Compound, 1940 (John Wiley & Sons).
Beilstein, vol. 26, (4th ed.), p. 228.
Gazzetti Chimica, vol. 39 I, pp. 540–549.